(12) United States Patent
Ito et al.

(10) Patent No.: US 12,435,790 B2
(45) Date of Patent: Oct. 7, 2025

(54) OIL SEAL STRUCTURE

(71) Applicant: SUBARU CORPORATION, Tokyo (JP)

(72) Inventors: Erika Ito, Tokyo (JP); Ayaka Yamamoto, Tokyo (JP); Noriaki Suzuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 18/239,488

(22) Filed: Aug. 29, 2023

(65) Prior Publication Data

US 2024/0093782 A1  Mar. 21, 2024

(30) Foreign Application Priority Data

Sep. 21, 2022 (JP) ................................ 2022-150215

(51) Int. Cl.
*F16J 15/02* (2006.01)

(52) U.S. Cl.
CPC .................................. *F16J 15/021* (2013.01)

(58) Field of Classification Search
CPC .......... F16J 15/02; F16J 15/021; F16J 15/022; F16J 15/06; F16J 15/061; F16J 15/062
See application file for complete search history.

(56) References Cited

U.S. PATENT DOCUMENTS

| | | | |
|---|---|---|---|
| 6,173,960 B1* | 1/2001 | Inose | F16J 15/3208 277/347 |
| 11,365,808 B2* | 6/2022 | Groweg | E21B 17/16 |
| 2014/0265145 A1* | 9/2014 | Copeland, III | F02C 7/28 277/358 |
| 2023/0160473 A1* | 5/2023 | Hosonuma | F16J 15/56 277/500 |

FOREIGN PATENT DOCUMENTS

| | | |
|---|---|---|
| JP | H5-65960 A | 3/1993 |
| JP | 2010-144884 A | 7/2010 |

* cited by examiner

*Primary Examiner* — Gilbert Y Lee
(74) *Attorney, Agent, or Firm* — MCGINN I.P. LAW GROUP, PLLC

(57) ABSTRACT

An oil seal structure is provided for sealing between a first member including an end surface having an opening and a second member covering at least the opening with an elastic annular seal member interposed between the first member and the second member. The oil seal structure includes an annular recess that is provided in the end surface of the first member in a manner of surrounding the opening. The annular recess accommodates the seal member in the annular recess with a part of the seal member protruding from the end surface. At least a surface of the seal member is in contact with oil is covered with a covering of an oil-resistant material, and the seal member is accommodated in the annular recess.

17 Claims, 3 Drawing Sheets

OIL SEAL STRUCTURE

CROSS-REFERENCE TO RELATED APPLICATIONS

The present application claims priority from Japanese Patent Application No. 2022-150215 filed on Sep. 21, 2022, the entire contents of which are hereby incorporated by reference.

BACKGROUND

The disclosure relates to an oil seal structure, and to an oil seal structure used in a vehicle in one example.

In the related art, in a vehicle, for example, a seal structure used for a mating surface of an oil passage, an intake manifold, or the like is known. As a seal member having such a seal structure, a rubber gasket made of synthetic rubber is generally used. Such a rubber gasket is expected to sufficiently achieve a sealing function such as prevention of outward leakage of oil and prevention of entry of oil, sand dust, rainwater, and the like.

However, in an oil seal structure using the rubber gasket for oil sealing in one example, generally acrylic rubber (ACM) or hydrogenated nitrile rubber (HNBR), there are the following problems. That is, in the rubber gasket for oil sealing, since the rubber gasket is constantly exposed to oil, an antioxidant added to the rubber gasket as a deterioration (aging) inhibitor gradually may flow into the oil for a long period of time, and a deterioration prevention function may be weakened.

Further, it is also confirmed that the rubber gasket has a smaller amount of antioxidant remaining in the rubber gasket in a vehicle that passes through a predetermined travel distance with a relatively small influence of heat than a rubber gasket that is subjected to a durability test under conditions such as a temperature more severe than that of a market environment in which the vehicle is actually placed. In such a situation of a temporal change, deterioration of the oil seal structure is accelerated more than that of initial durability performance, and an oil sealing function may also be impaired in the middle of a life of the vehicle.

As an oil seal structure, for example, Japanese Unexamined Patent Application Publication (JP-A) No. 2010-144884 proposes a seal structure in which a groove for an O-ring is formed on one flange mating surface, and in which the O-ring is hollow and has a through hole toward an outside (in a direction opposite to a side of a flange where oil is present) and is filled with a liquid gasket before being compressed. According to this seal structure, after fastening the flange, the liquid gasket with which an inside of the compressed O-ring is filled overflows and spreads over the flange mating surface. Therefore, a step of applying the liquid gasket to the flange mating surface before fastening the flange can be omitted, a workload of flange fastening can be reduced, and high sealing performance can be achieved.

In addition, for example, JP-A-H5-65960 proposes a seal structure of a joined surface between a lubricating oil passage provided in a wall of an oil pan and a lubricating oil passage provided in a cylinder block by joining a top surface of the oil pan and a lower end surface of the cylinder block. In this seal structure, an annular joined surface (end surface) facing the cylinder block is provided on the top surface of the oil pan, an annular groove surrounds the joined surface, a seal ring is inserted into an inner diameter side of the annular groove which is an oil passage side, and a liquid gasket is injected so as to fill an outer periphery around the seal ring in the annular groove. Accordingly, since the lubricating oil passage is sealed by the seal ring, lubricating oil is prevented from leaking from the lubricating oil passage to an outside, the liquid gasket does not enter the lubricating oil passage, and the seal structure is also easily processed.

SUMMARY

An aspect of the disclosure provides an oil seal structure for sealing between a first member including an end surface having an opening and a second member covering at least the opening with an elastic annular seal member interposed between the first member and the second member. The oil seal structure includes an annular recess that is provided in the end surface of the first member in a manner of surrounding the opening. The annular recess accommodates the seal member in the annular recess with a part of the seal member protruding from the end surface. At least a surface of the seal member is at least in contact with oil is covered with a covering of an oil-resistant material, and the seal member is accommodated in the annular recess.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

In both the seal structures proposed in JP-A-2010-144884 and JP-A-H05-65960, a state is not eliminated in which the O-ring (annular rubber gasket) is exposed on a side, where the oil is present, to be sealed. In order to compensate for the sealing performance of the O-ring in this state, the liquid gasket is supplementarily used for sealing or filling a surface opposite to a surface of the O-ring in contact with the oil. Therefore, the O-ring comes into direct contact with the oil, and may deteriorate due to the oil.

It is desirable to provide an oil seal structure having a long life and high performance in which durability of a rubber gasket can be maintained and sealing performance is also improved with a simple configuration.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 6:
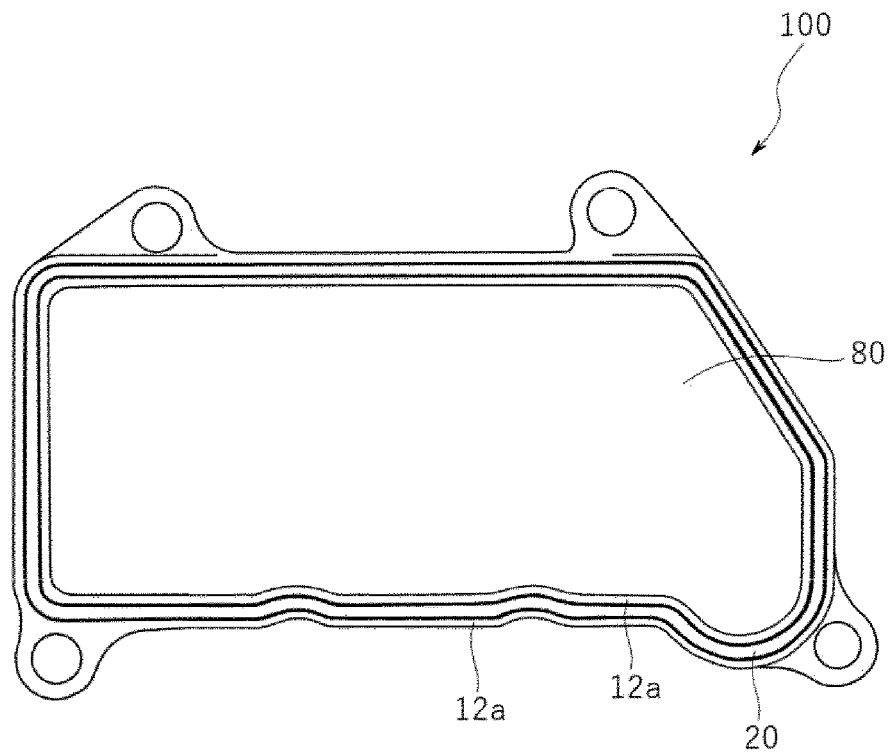
FIG. 6 is a plan view of an inner side of a rocker cover used in a vehicle.

FIG. 6 illustrates a planar configuration of an inner side of a rocker cover 100, as an example, to which the seal structure according to the embodiment of the disclosure is to be applied. The rocker cover 100 covers a cylinder head from above with a cam carrier disposed on an upper surface of the cylinder head being interposed between the rocker cover 100 and the cylinder head, so that the rocker cover 100 plays a role of preventing oil which mainly lubricates a rocker arm, a camshaft, or the like from scattering to an outside. Therefore, the rocker cover 100 is intended to have an oil seal structure for preventing the oil from leaking to the outside.

The rocker cover 100 has an opening 80 in a central part thereof, an outer peripheral part of the opening 80 is an end surface 12a, and the end surface 12a surrounds the opening 80. An annular recess 20 having a predetermined depth is formed in the end surface 12a and extends in a manner of surrounding the opening 80. The annular recess 20 is an element of the oil seal structure, and accommodates a seal member therein as described later.

Figure 1:
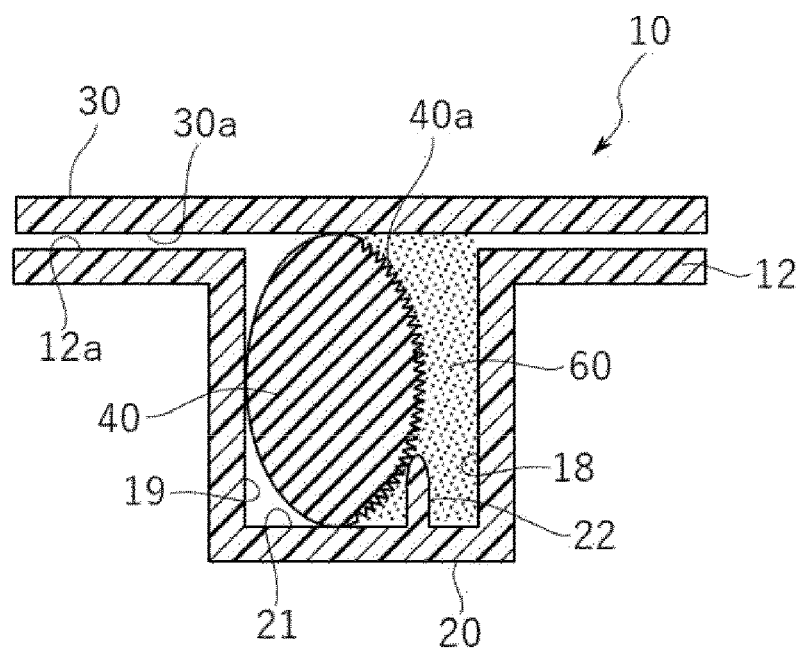
FIG. 1 is a schematic view illustrating a longitudinal cross section of an oil seal structure according to an embodiment of the disclosure.

FIG. 1 illustrates a longitudinal cross-sectional configuration of an oil seal structure 10 according to an embodiment of the disclosure. As illustrated, the annular recess 20 having a predetermined width and depth is provided in the end surface 12a of a first member 12. The annular recess 20 has a substantially horizontal bottom surface 21 and two side walls 18 and 19 that are perpendicular to the bottom surface 21 and that face each other. A seal member 40 is accommodated in the annular recess 20 in a manner of being placed on the bottom surface 21.

Figure 5:
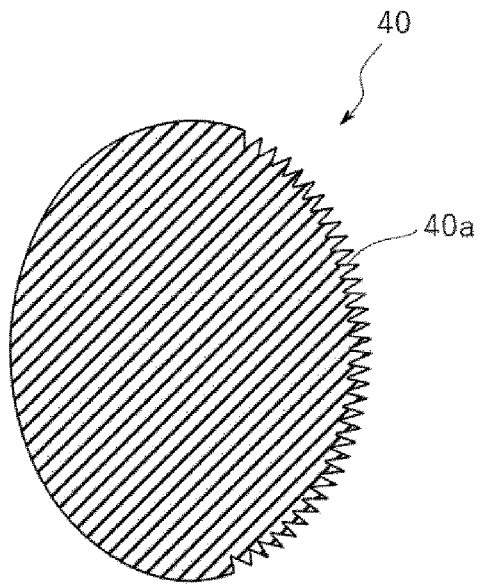
FIG. 5 is a schematic view illustrating a vertical cross section of a seal member.

FIG. 5 illustrates a vertical cross-sectional shape of a rubber gasket, which is the seal member 40 used in the present embodiment and has a substantially elliptical shape as illustrated. Further, the seal member 40 has an annular shape having a length extending over an entire length of the annular recess 20, and is made of, for example, acrylic rubber (ACM) or hydrogenated nitrile rubber (HNBR) as a material thereof.

Further, a rough surface 40a having continuous small irregularities is formed on a surface of the seal member 40, on a side (right side in FIG. 5) where the oil is present, in a state of being accommodated in the annular recess 20. The rough surface 40a is provided to improve surface fixability of an oil-resistant material to be described later. The rough surface 40a may be formed by roughening such as sandblasting or sanding with sand paper.

In the embodiment in FIG. 1, a surface of the accommodated seal member 40 on the side where the oil is present is covered with an oil-resistant material 60. The covering is achieved either by applying the liquid oil-resistant material 60 to the surface of the seal member 40 on the side where the oil is present or by retaining the oil-resistant material 60 having viscosity between the surface of the seal member 40 on the side where the oil is present and the inner wall 18. Here, the retaining means that the oil-resistant material 60 can be present with a thickness larger than that when the oil-resistant material 60 is simply applied. In the embodiment in FIG. 1, a space between the surface of the seal member 40 on the side where the oil is present and the inner wall 18 is filled with the oil-resistant material 60 having viscosity. Accordingly, the oil-resistant material 60 is interposed between the seal member 40 and the oil. In addition, a thick layer of the oil-resistant material 60 can be provided, and a possibility that the oil permeates through the oil-resistant material 60 can be reduced. The seal member 40 is not in direct contact with the oil, and as a result, an antioxidant contained in the seal member 40 is less likely to flow into the oil. Accordingly, deterioration of the seal member 40 is prevented, that is, durability performance of the seal member 40 is maintained, and a life of the oil seal structure using the seal member 40 is prolonged.

In the present embodiment, a width of the annular recess 20 is larger than a thickness (thickness in a left-right direction in FIG. 1) of the seal member 40, and a space is present between an outer side surface of the seal member 40 and the wall surface of the annular recess 20. Further, in the present embodiment, the seal member 40 does not move toward the inner wall 18 on the side where the oil is present due to protrusions 22 protruding from the bottom surface 21. The protrusions 22 are dispersedly or continuously provided on the bottom surface 21 inside the annular recess 20 in a circumferential direction. With this configuration, it is possible to take a large retaining amount of the oil-resistant material 60 to prevent the deterioration due to oil applied to a surface of the seal member 40. As described above, since the rough surface 40a is provided on the surface of the seal member 40 on the side where the oil is present, the oil-resistant material 60 applied or retained on the surface of the seal member 40 has favorable fixability.

When the surface of the seal member 40 is covered by retaining the oil-resistant material 60, the seal member 40 may also be immersed in the oil-resistant material 60 after the annular recess 20 is filled with the oil-resistant material 60 and accommodates the seal member 40 therein. Alternatively, the oil-resistant material 60 may be injected after the seal member 40 is accommodated in the annular recess 20.

Here, as the oil-resistant material 60, for example, a formed in place gasket (FIPG, liquid gasket) is used. A general-purpose FIPG may be used. A general FIPG contains oil or silicone which is a material resistant to heat as a main component, and starts to cure when about 30 minutes elapses after being applied under a room temperature condition.

By using the FIPG as the oil-resistant material 60 to be applied to the seal member 40, not only oil resistance but also heat resistance of the seal member 40 is enhanced. In one example, when the FIPG is retained on the seal member 40 in the annular recess 20 or a large amount of FIPG is present between the seal member 40 and the inner wall 18 of the annular recess 20 on the side where the oil is present, even when an end surface 30a of a second member 30 is slightly displaced (opened) with respect to the end surface 12a of the first member 12 which faces the end surface 30a after the seal structure 10 is assembled, the FIPG can follow the displacement due to viscoelasticity or adhesion unique to the FIPG, and generation of a gap through which the oil enters is prevented. That is, with this configuration, oil sealing performance is improved, and durability of the oil seal structure is also improved.

Figure 2:
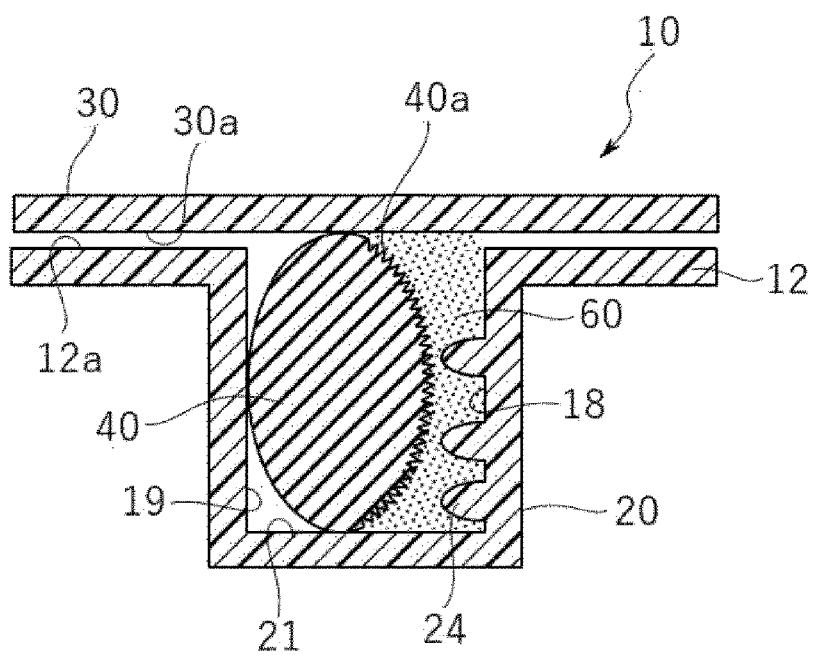
FIG. 2 is a schematic view illustrating a longitudinal cross section of an oil seal structure according to another embodiment of the disclosure.

FIG. 2 illustrates a structure according to another embodiment. The same elements as those described in the embodiment in FIG. 1 are denoted by the same reference numerals, and description thereof is omitted.

As illustrated in FIG. 2, multiple protrusions 24 are disposed at three positions in a height direction on a surface of the inner wall 18 of the annular recess 20. The protrusions 24 are continuously or dispersedly disposed in an extending direction of the annular recess 20. As in the case in FIG. 1, the seal member 40 is accommodated in the annular recess 20 in a manner of being close to the inner wall 19 on a side where the oil is not present. Here, the oil-resistant material 60 is retained between the rough surface 40a of the seal member 40 on a side where the oil is present and the inner wall 18 of the annular recess 20 on a side where the oil is present.

According to the present embodiment, presence of the protrusions 24 on the surface of the inner wall 18 can prevent the seal member 40 from being displaced by moving in a radial direction in the annular recess 20 after being disposed in the annular recess 20. Therefore, not only is the seal member 40 prevented from being close to the inner wall 18 before the oil-resistant material 60 is fixed to the seal member 40, but a layer of the oil-resistant material 60 is also more suitably provided between the surface of the seal member 40 on the side where the oil is present and the inner wall 18 of the annular recess 20.

Figure 3:
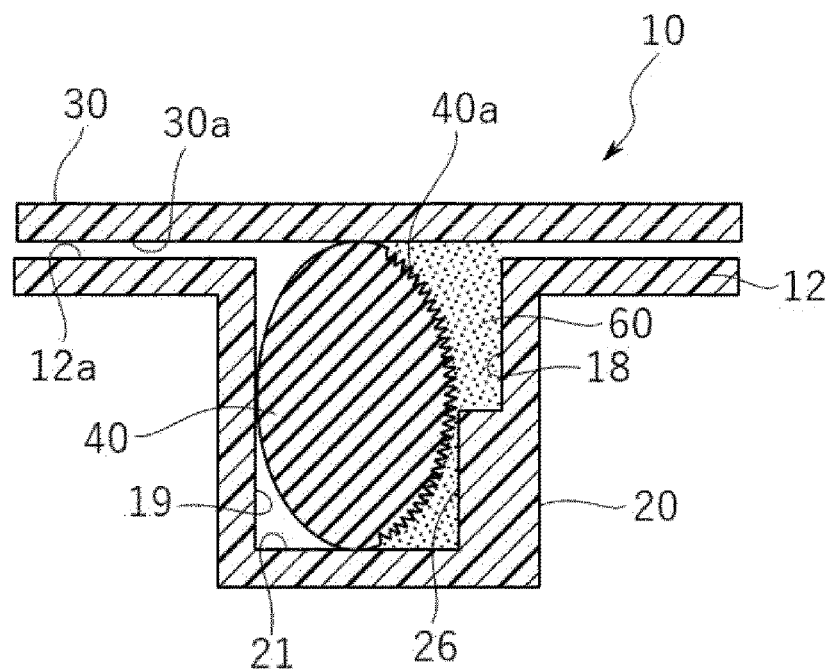
FIG. 3 is a schematic view illustrating a longitudinal cross section of an oil seal structure according to still another embodiment of the disclosure.

FIG. 3 illustrates a structure according to still another embodiment. The same elements as those described in the embodiment in FIG. 1 are denoted by the same reference numerals, and description thereof is omitted.

As illustrated in FIG. 3, a step 26 rising from the bottom surface 21 to a middle position is provided on the inner wall 18 in the annular recess 20. As in the case in FIG. 1, the seal member 40 is accommodated in the annular recess 20 in a manner of being close to the inner wall 19 on a side where the oil is not present. Here, the oil-resistant material 60 is retained between the rough surface 40a of the seal member 40 on a side where the oil is present and the inner wall 18 of the annular recess 20 on a side where the oil is present and where the step 26 is provided.

According to the present embodiment, a configuration is made simpler than the configuration in which the protrusions 22 or the protrusions 24 are provided in a circumferential direction in the annular recess 20, and a use amount of the oil-resistant material 60 can be reduced.

Figure 4:
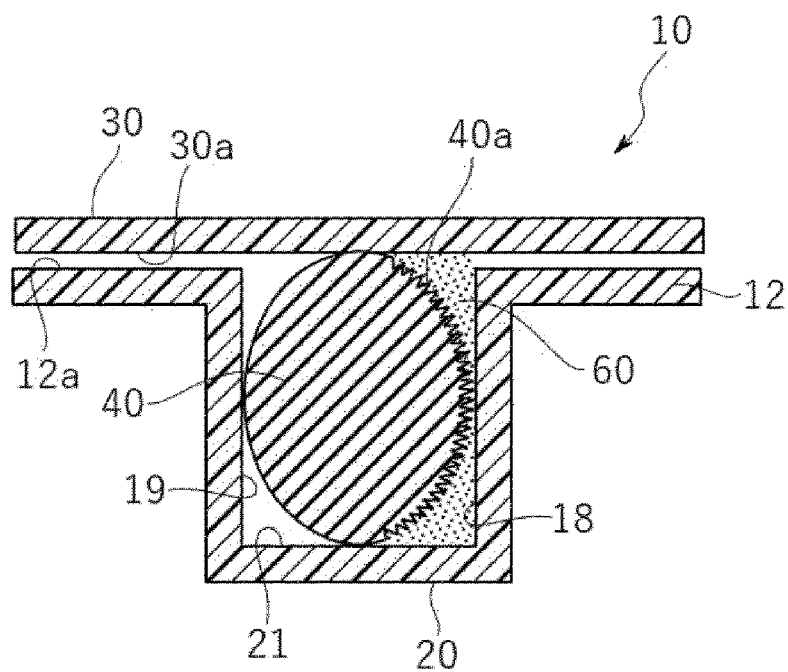
FIG. 4 is a schematic view illustrating a longitudinal cross section of an oil seal structure according to still another embodiment of the disclosure.

FIG. 4 illustrates a structure according to still another embodiment. The same elements as those described in the embodiment in FIG. 1 are denoted by the same reference numerals, and description thereof is omitted.

As illustrated in FIG. 4, dimensions of the seal member 40 accommodated in the annular recess 20 are adjusted such that a width of the seal member 40 in a radial direction is substantially equal to a width between the inner wall 18 and the inner wall 19 of the annular recess 20. In the present embodiment, a slightly thin layer of the oil-resistant material 60 is provided between the rough surface 40a of the seal member 40 on a side where oil is present and the inner wall 18 of the annular recess 20 on a side where the oil is present. In addition, the dimensions may also be adjusted such that the seal member 40 is fitted into the annular recess 20 in a manner of being in close contact with both the inner walls 18 and 19.

According to the present embodiment, since it is not necessary to provide the protrusions 22, the protrusions 24, or the step 26 in the annular recess 20, not only can the configuration be further simplified, but a use amount of the oil-resistant material 60 can also be reduced. Although there is little space for application or retention of the oil-resistant material 60, sealing performance is improved due to contact of upper and lower sides and a side surface of the seal member 40 with the annular recess 20. Since contact of the oil with the oil-resistant material 60 is substantially limited to simply an upper part, a protective action of the seal member 40 is not reduced as well.

The embodiments mainly applied to a rocker cover in a vehicle according to the disclosure are described above, and the disclosure is similarly applicable to any other oil seal mechanism as well as the rocker cover. For example, the disclosure is also applicable to other oil seal mechanisms for preventing oil leakage, such as a chain cover.

Further, a vehicle model to which the disclosure is to be applied is not limited to a passenger vehicle, and the disclosure is naturally applicable to, for example, a large mobility machine or an industrial machine (vehicle) provided for use in a severe environment.

The disclosure is not limited to applications of the above-described embodiments, and various modifications may be made without departing from technical ideas described in the claims, the specification, and the drawings, that is, the gist of the disclosure.

For example, an example is described in which a side surface of the seal member 40 on a side where oil is present is roughened in the present embodiment, but this is not a notable configuration, and the seal member 40 may have a smooth surface.

A material having the same function is also applicable as the oil-resistant material 60, and fluorine-based grease based on fluorinated polyether may also be used. The fluorine-based grease has advantages of being excellent in oil resistance, load resistance, heat resistance, and the like, having affinity with rubber, and being less likely to affect performance of the rubber, and is therefore suitable for use in the seal structure according to the disclosure.

According to the seal structure in the disclosure, an oil seal structure having a long life and high performance is provided in which durability of a rubber gasket can be maintained and sealing performance is also improved with a simple configuration.

The invention claimed is:

1. An oil seal structure comprising:
a first member comprising a first surface having an opening, the opening communicating a space containing oil;
a second member comprising a second surface, the second surface facing the first surface;
an annular recess provided in the first surface of the first member in a manner of surrounding the opening, the annular recess including a bottom surface facing the second surface;
a seal member comprising an elastic material and accommodated within the annular recess, the seal member being in contact with the bottom surface and the second surface, the seal member being configured to separate a space between the first and second surfaces into a first space and a second space, the first space communicating with the opening; and
a covering disposed in the first space and including an oil-resistant material, the cover covering a surface of the seal member that faces toward the first space,
wherein at least a surface of the seal member that is in contact with oil is covered with the covering, and the seal member is accommodated in the annular recess, and wherein the surface of the seal member that faces toward the first space includes at least a portion of a surface facing radially inward on the seal member that is annular.

2. The oil seal structure according to claim 1, wherein the covering is formed by applying a liquid oil-resistant material to the surface of the seal member or by retaining a viscous material on the surface of the seal member.

3. The oil seal structure according to claim 2, wherein a protrusion is provided on the bottom surface of the annular recess or an inner wall surface of the annular recess, the inner wall surface facing the surface of the seal member that faces toward the first space.

4. The oil seal structure according to claim 1, wherein the annular recess and the seal member are configured so that one of the left and right walls of the annular recess is in direct contact with a corresponding one of left and right side surfaces of the seal member and the other of the left and right walls of the annular recess is separated from the other of the left and right side surfaces of the seal member.

5. The oil seal structure according to claim 4, wherein a protrusion is provided on the bottom surface of the annular recess or an inner wall surface of the annular recess, the inner wall surface facing the surface of the seal member that faces toward the first space.

6. The oil seal structure according to claim 1, wherein the annular recess and the seal member are configured so that the accommodated seal member is in close contact with left and right walls of the annular recess.

7. The oil seal structure according to claim 1, wherein a protrusion is provided on the bottom surface of the annular recess or an inner wall surface of the annular recess, the inner wall surface facing the surface of the seal member that faces toward the first space.

8. An oil seal structure comprising:
a first member comprising a first surface having an opening, the opening communicating a space containing oil;
a second member comprising a second surface, the second surface facing the first surface;
an annular recess provided in the first surface of the first member in a manner of surrounding the opening, the annular recess including a bottom surface facing the second surface;
a seal member comprising an elastic material and accommodated within the annular recess, the seal member being in contact with the bottom surface and the second surface, the seal member being configured to separate a space between the first and second surfaces into a first space and a second space, the first space communicating with the opening; and
a covering disposed in the first space and including an oil-resistant material, the cover covering a surface of the seal member that faces toward the first space,
wherein at least a surface of the seal member that is in contact with oil is covered with the covering, and the seal member is accommodated in the annular recess,
wherein the annular recess includes a side wall facing a part of the surface of the seal member that faces toward the first space,
wherein the covering is a cured formed in place gasket, and
wherein the cured formed in place gasket extends from the bottom surface to the second surface, and is in direct contact with the bottom surface, the side wall, the second surface and the seal member.

9. The oil seal structure according to claim 8, further comprising a positioning member disposed between the seal member and the side wall,
wherein the positioning member is configured to position the seal member so that the seal member is separated from the side wall.

10. The oil seal structure according to claim 9, wherein the positioning member is a protrusion protruding from the bottom surface.

11. The oil seal structure according to claim 10, wherein the cured formed in place gasket is configured to prevent contact between the oil and the seal member.

12. The oil seal structure according to claim 11, further comprising a rough surface formed on the surface of the seal member that faces toward the first space.

13. An oil seal structure comprising:
a first member comprising a first surface;
a second member comprising a second surface facing the first surface;
a seal member in contact with the first and second surfaces, the seal member being configured to separate a space between the first and second surfaces into a first space and a second space, the first space being a space in which an oil is disposed; and
a cured formed in place gasket disposed in the first space, the cured formed in place gasket covering a surface of the seal member that faces toward the first space, the cured formed in place gasket being in direct contact with the surface of the seal member,
wherein the first surface includes a bottom surface of a recess formed in the first member,
wherein the recess includes a side wall located in the first space,
wherein the side wall extends from the bottom surface toward the second surface, and faces the seal member,
wherein the seal member is in contact with the bottom surface and the second surface, and
wherein the cured formed in place gasket is surrounded by the bottom surface, the side wall, the second surface, and the seal member,
further comprising a positioning member disposed between the seal member and the side wall,
wherein the positioning member being configured to position the seal member so that the seal member is separated from the side wall.

14. The oil seal structure according to claim 13, wherein the positioning member is a protrusion protruding from the bottom surface.

15. The oil seal structure according to claim 14, wherein the cured formed in place gasket is in direct contact with the bottom surface, the side wall and the second surface.

16. The oil seal structure according to claim 15, wherein the cured formed in place gasket is configured to prevent contact between the oil and the seal member.

17. The oil seal structure according to claim 16, further comprising a rough surface formed on the surface of the seal member that contact with the cured formed in place gasket,
wherein the rough surface including continuous small irregularities formed on the surface of the seal member.

* * * * *